United States Patent [19]

Van Deventer

[11] Patent Number: 5,457,563
[45] Date of Patent: Oct. 10, 1995

[54] OPTICAL MIXING DEVICE HAVING ONE PHOTODETECTOR FOR A HETERODYNE RECEIVER

[75] Inventor: Mattijs O. Van Deventer, Leidschendam, Netherlands

[73] Assignee: Koninklijke PTT Nederland N.V., Groningen, Netherlands

[21] Appl. No.: 74,059

[22] Filed: Jun. 9, 1993

[30] Foreign Application Priority Data

Jun. 25, 1992 [NL] Netherlands .......................... 9201130

[51] Int. Cl.⁶ .................................................. H04B 10/06
[52] U.S. Cl. .................................................... 359/191
[58] Field of Search ................................. 359/191, 192

[56] References Cited

U.S. PATENT DOCUMENTS

| 4,506,388 | 3/1985 | Monerie | 359/192 |
| 4,723,316 | 2/1988 | Glance | 359/192 |
| 4,916,705 | 4/1988 | Glance | 359/191 |
| 5,023,950 | 1/1989 | Tsushima | 359/191 |

FOREIGN PATENT DOCUMENTS

| 0147436 | 6/1989 | Japan | 359/191 |
| 2121636 | 12/1983 | United Kingdom . | |
| 2172164 | 9/1986 | United Kingdom . | |
| 8800415 | 1/1988 | WIPO | 359/191 |

OTHER PUBLICATIONS

C. J. Mahon, et al, "Relative Intensity Noise Suppression with High–Birefringence Fibre in a 2.5 GBit/s CP–FSK Optical Communication System with Heterodyne Receiver", IOOC–ECOC 1991, Paris, Sep. 9–12, 1991, pp. 473–476.

*Primary Examiner*—Leslie Pascal
*Attorney, Agent, or Firm*—Frishauf, Holtz, Goodman, Langer & Chick

[57] ABSTRACT

An optical mixing device having intensity-noise suppression, for use in a heterodyne receiver, comprises a coupler (31) having two optical input ports (32, 33) for a received signal ($E_S$) and a local oscillator signal ($E_L$), respectively, and two optical output ports (34, 35). An optical path-length difference is created between light signals emerging from the two output ports (34, 35) and a photodetector (36), and the light signals are fed from the output ports (34, 35) to the photodetector (36) in separate beams. The mixing device has a simple optical fiber construction and does not require polarization-influence devices. A coherent heterodyne receiver is also provided which includes the optical mixing device.

4 Claims, 1 Drawing Sheet

OPTICAL MIXING DEVICE HAVING ONE PHOTODETECTOR FOR A HETERODYNE RECEIVER

BACKGROUND OF THE INVENTION

1. Field of the Invention

The invention is in the field of coherent detection such as is used in optical communication systems. More particularly, it relates to an optical mixing device having one photodetector for a heterodyne receiver and a heterodyne receiver provided with such an optical mixing device.

2. Prior art

In a coherent optical heterodyne receiver, a received optical signal is mixed in a mixing device with an optical signal originating from a local oscillator. In this connection, it is a known problem that both the local oscillator signal and the received optical signal exhibit unwanted amplitude variations which are referred to as relative intensity noise (RIN). A first procedure for suppressing this intensity noise is known as balanced detection. A heterodyne receiver in which such balanced detection is used is disclosed, for example, in references [1] and [2]. According to the procedure disclosed therein, the two output signals from a combined coupler/beam splitter are detected by separate photodetectors and then, in a downstream preamplifier circuit, are either first amplified separately and then subtracted or first added in antiphase and then amplified. In this case, use is made of the fact that, at the outputs of such a coupler/beam splitter, the coherent mixing products are in antiphase. Since the intensity noise at the two outputs of the mixing device is equal, it is therefore suppressed, if not completely, nevertheless appreciably. In addition, an intermediate-frequency signal is obtained which is twice as strong in terms of intensity.

Such a balanced detection has the advantage that intensity-noise suppression is obtained without an appreciable loss of signal power. It has the drawback, however, that it is based on two photodetectors which, possibly including associated preamplifiers, must be to a large extent identical to one another, which implies a quality requirement having a strong cost-increasing effect.

A second procedure for intensity-noise suppression, as disclosed in references [3] and [4], eliminates the drawback mentioned. According to this second procedure, at least a portion of the total signal available at the output side of the coupler/beam splitter is split into two signal components having equal power and mutually perpendicular polarisations. Said two signal components are fed to one and the same photodetector, however, in such a manner that they arrive there as one light signal beam but with a mutual phase difference as a consequence of a difference in the optical path length. Said phase difference is chosen such that, at the photodetector, the intermediate-frequency mixing products in the two signal components are in phase, i.e. reinforce one another, whereas the noise components, at least in a relevant region around the intermediate frequency, the intermediate-frequency band, are precisely in antiphase and therefore extinguish one another. Signals outside the intermediate-frequency band are filtered out with electrical filters. The procedure in accordance with reference [3] achieves this by feeding the light signal available at one output of the coupler/beam splitter via a section of highly birefringent (hi-bi) glass fiber having a suitably chosen length to the photodetector. The drawback of this is that only half of the signal power available at the output of the coupler/beam splitter is used and that, in addition, a section of relatively expensive hi-bi fiber is necessary. The procedure according to reference [4] is explained by reference to FIG. 1. According to this known procedure, an optical input signal $E_S$ and an optical local-oscillator signal $E_L$ are fed with mutually identical polarisations to the inputs 1 and 2 of a 3 dB beam splitter 3. Both essentially identical output signals $(E_S+E_L)$ from the 3 dB beam splitter 3 are then fed along separate light paths 4 and 5, via reflecting mirrors 6 and 7 and directly, respectively, to inputs 8 and 9 of a 'polarising' (or polarisation-sensitive) beam splitter 10, an output 11 of which is directed at a photodetector 12. Incorporated in one of the light paths, in this case light path 4, is a $\pi/2$ polarisation rotator 13, with the result that both light signals reach the polarising beam splitter 10 with mutually orthogonal polarisations and emerge via the output 11 as one signal beam. Although this known procedure provides a mixing device having only one photodetector, which provides the same 'performance' as the balanced-detection procedure described above and involving two photodetectors, it nevertheless has the drawback that the mixing device requires polarisation-dependent and polarisation-sensitive components and that, as a consequence thereof, an optical fiber construction or an integrated construction of the mixing device is not easy to achieve.

SUMMARY OF THE INVENTION

The object of the invention is to provide an optical mixing device for a heterodyne receiver which has essentially the same 'performance' as, but is simpler than, the mixing device disclosed in reference [4] and lacks the abovementioned drawbacks. The invention is based on the insight that, to achieve the same 'performance' it is not necessary that the two signal components of equal power originating from the coupler/beam splitter must first be collimated to form one light-signal beam before striking the photodetector. It is necessary and adequate for the two signal components to strike the photodetector with the correct mutual phase difference. Since the coherent mixing products are in antiphase in the two emerging signal components at the output of the coupler/beam splitter, whereas the intensity-noise signals in said two components are exactly in phase, at least in the intermediate-frequency band, only a corresponding difference in optical path length is necessary between the light paths along which the two signal components are fed to the photodetector to achieve such a phase difference.

According to the invention, a mixing device for a coherent optical receiver comprising a combined power coupler/splitter having two optical input ports for a received signal and a localoscillator signal, respectively, and two optical output ports, means for creating an optical path-length difference between light signals emerging from the two output ports, and a photodetection device, the light signals mentioned being intended for the photodetection device, has, for this purpose, the characteristic that the mixing device furthermore comprises means for feeding said light signals to the photodetection device in separate beams.

Since difference in optical path length is only necessary for the two signal components emerging from the coupler/beam splitter before they reach the photodetector, the mixing device according to the invention has a simple optical fiber construction. In a preferred embodiment, the mixing device has the characteristic that the combined power coupler/beam splitter and the feed means are formed by an optical fiber coupler having optical fiber sections as the output ports, which fiber sections are unequal in length in order to create said path-length difference, and the ends of which fiber sections are fused together near the photodetection device.

The object of the invention is moreover to provide a coherent optical receiver provided with such a mixing device.

REFERENCES

[1] GB-A-2121636;
[2] GB-A-2172164;
[3] US-A-4,697,284;
[5] C. J. Mahon, et al.: "Relative intensity noise suppression with high-birefringence fiber in a 2.5 Gbit/s CP-FSK optical communication system with heterodyne receiver", IOOC-ECOC '91, Paris, Sep. 9-12, 1991, pp. 473-476.

BRIEF DESCRIPTION OF THE DRAWING

To explain the invention, use is made of a drawing which comprises the following figures.

DETAILED DESCRIPTION

Figure 1:
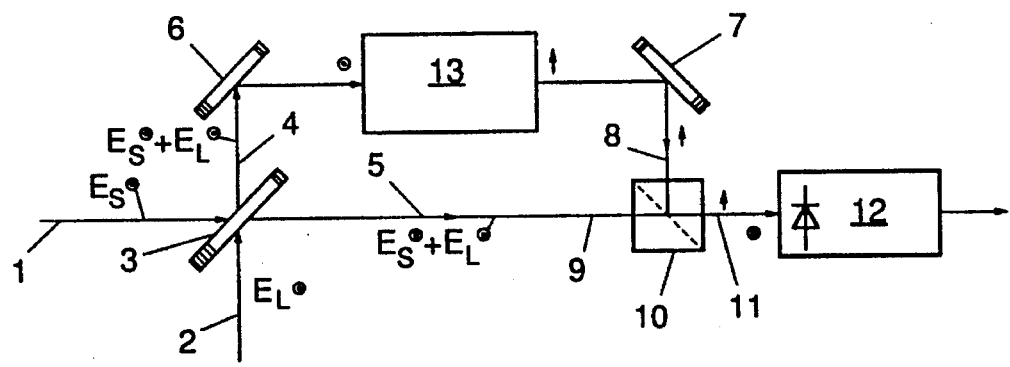
FIG. 1 shows diagrammatically a known optical mixing device (from reference [4]) having one photodetector for a heterodyne receiver.
Figure 2:
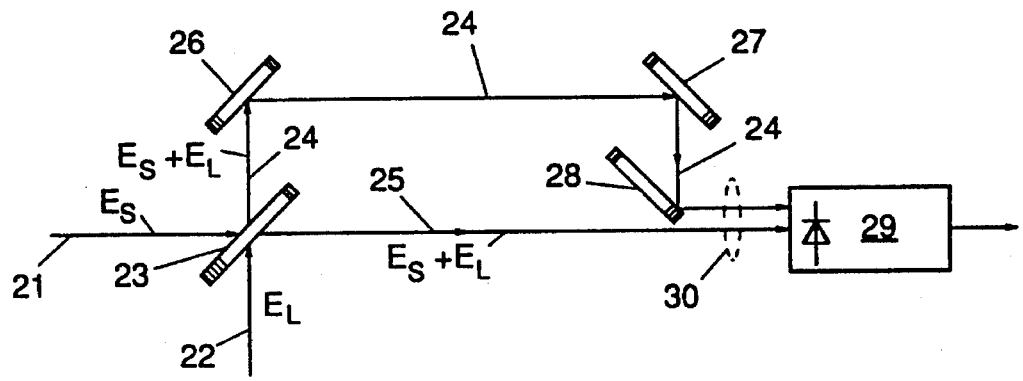
FIG. 2 shows diagrammatically an optical mixing device having one photodetector for a heterodyne receiver according to the invention.

FIG. 2 shows an optical mixing device having one photodetector as photodetection device for a heterodyne receiver. As in the mixing device shown in FIG. 1, an optical input signal $E_S$ and an optical local-oscillator signal $E_L$ having mutually identical polarisations are fed, respectively, to the inputs 21 and 22 of a 3 dB beam splitter 23. Both essentially identical output signals ($E_S+E_L$) of the 3 dB beam splitter 23 are then fed along separate light paths 24 and 25 via reflecting mirrors 26, 27 and 28, and directly, respectively, to the photosensitive surface of a photodetector 29. In this arrangement, the reflecting mirror 28 is positioned in such a way that it allows the output signal in the light path 25 to pass unaffected, whereas the light signal in the light path 24 is reflected in the direction of the photodetector. By adjusting the mutual spacing between the 3dB beam splitter 23 and the mirror 26 and the mutual spacing between the mirrors 27 and 28, it is possible to ensure that the two output signals reach the photodetector 29 with a suitable optical path-length difference. Omitting the mirrors 27 and 28, the same can be achieved by only adjusting the mutual spacing between the 3 dB coupler 23 and the mirror 26 if the latter reflects directly towards the photodetector 29. Optionally, a lens 30 which focuses the signal components propagating via the light paths 24 and 25 on the photosensitive surface of the photodetector 29 may be sited near the photodetector 29. Of course, to obtain the desired optical path-length difference, the light path 24 can be fed through an optically denser medium over a suitably chosen length.

Figure 3:
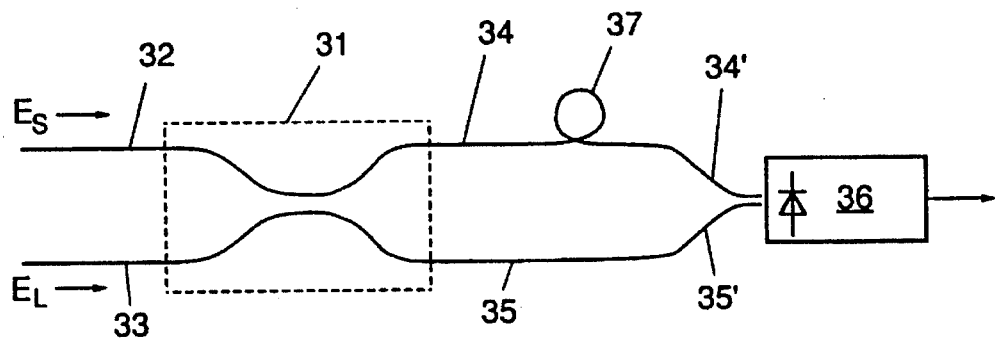
FIG. 3 shows diagrammatically an optical fiber construction of the mixing device according to the invention.

In order to obtain at the photodetector, on the one hand, a reinforcement of the intermediate-frequency coherent products and, on the other hand, the desired extinction of the intensity noise present in each of the two signal components, the optical path-length difference must be such that the signal component which propagates via the light path 24 arrives at the photodetector 30 with a delay time T with respect to the signal component which propagates via the light path 25, the connection between the delay time T and the intermediate frequency IF being given by the relationship $T*IF=\frac{1}{2}(2k+1)$, wherein $k=0,\pm 1,\pm 2,\ldots$ A simple embodiment of the mixing device is obtained if a fiber coupler based on two coupled optical fibers is used for the 3 dB coupler, the desired optical path-length difference being achieved by a suitable difference in length between the outgoing fibers. FIG. 3 shows diagrammatically such a design of the mixing device. A fiber coupler 31 has input fibers 32 and 33 and output fibers 34 and 35 whose ends 34' and 35', respectively, are directed at a photodetector 36. Output fiber 34 has a suitably chosen excess length with respect to the output fiber 35, indicated in the figure by a loop 37. Standard monomode optical fibers have a cladding (cross section approximately 125 μm) with a core (cross section approximately 8 μm), the actual waveguide, centrally situated therein. In order to bring the cores in the ends 34' and 35' of the output fibers 34 and 35 closer together and to fix them with respect to one another, the claddings of the fibers are preferably fused together at the position of the ends. Light signals emerging from the cores can therefore strike the photosensitive surface with a smaller spread. The cross section of the photosensitive surface of common photodetectors is approximately 40 mm. In principle, detection of all the light emerging from the fiber ends is therefore possible.

An integrated optical design of the mixing device is also possible, in which case a delay guide of suitable length can be used in the light path 24, which delay guide feeds through an optical medium having a higher refractive index than the optical medium in which the coupler/beam splitter 23 and the other light path 25 are formed.

I claim:

1. An optical mixing device for a heterodyne receiver, comprising:
    a combined power coupler/splitter including:
        two optical input ports for receiving a received optical signal and an optical local oscillator signal, respectively; and
        two optical output ports, the combined power coupler/splitter producing two output signals, each output signal including coherent mixed products of the signals inputted to the two input ports, the two output signals being outputted on respective different ones of the two optical output ports in antiphase;
    means for creating an optical path-length difference between the two output signals outputted from the two optical output ports;
    a single photodetector for detecting each of the two optical output signals;
    feed means for feeding said two optical output signals to the single photodetector in respective separate light beams.

2. The optical mixing device of claim 1, wherein:
    the combined power coupler/splitter and the feed means comprise an optical fiber coupler having optical fiber sections as the output ports, which optical fiber sections are unequal in length in order to create said optical path-length difference; and
    the optical fiber sections have respective ends which are fused together near the single photodetector.

3. A coherent optical heterodyne receiver comprising:
    a signal input for receiving a first optical signal;
    a local oscillator for generating a second optical signal;

a mixing device for mixing the first optical signal and the second optical signal, and for emitting two essentially identical, coherent optical mixed signals having an intermediate frequency IF and being in antiphase, said coherent optical mixed signals being emitted at a first output port and a second output port, respectively;

a single photodetector for detecting each of the coherent optical mixed signals emitted from said first and second output ports of the mixing device; and feed means for feeding the coherent optical mixed signals emitted from the mixing device in separate light beams to the single photodetector along different optical paths, the different optical paths having an optical path-length difference for creating a delay time T between the separate light beams upon arrival at the photodetector, the delay time T (sec) and the intermediate frequency IF ($sec^{-1}$) of the coherent optical mixed signals satisfying the relationship $T*IF=\frac{1}{2}(2k+1)$, where $k=0,\pm 1, \pm 2, \ldots$ 4. The coherent optical receiver of claim 3, wherein:

the mixing means and the feed means comprise an optical fiber coupler having optical fiber sections as the output ports, which optical fiber sections are unequal in length in order to create said path-length difference; and the optical fiber sections have respective ends which are fused together near the single photodetector.

* * * * *

UNITED STATES PATENT AND TRADEMARK OFFICE
CERTIFICATE OF CORRECTION

PATENT NO. : 5,457,563
DATED : October 10, 1995
INVENTOR(S) : Mattijs O. VAN DEVENTER It is certified that error appears in the above-indentified patent and that said Letters Patent is hereby corrected as shown below:

Title page, Item [56] References Cited,

Under "U.S. PATENT DOCUMENTS", change "4,916,705  4/1988  Glance ....359/191" to
          --4,916,705  4/<u>1990</u>  Glance ....359/191--;

after "5,023,950  1/1989  Tsushima....359/191"
         insert --4,697,284  9/1987  Glance...359/191
            4,723,314  2/1988  Schneeberger...359/191--.

Under "FOREIGN PATENT DOCUMENTS" insert:

--0 256 647 A2  2/1988  Europe
        60-120333       6/1985  Japan--.

Signed and Sealed this

Third Day of June, 1997

Attest:

*Attesting Officer*

BRUCE LEHMAN
*Commissioner of Patents and Trademarks*